(No Model.)
G. O. PEARCE.
PROCESS OF EXTRACTING GOLD FROM SOLUTIONS.
No. 556,690. Patented Mar. 17, 1896.
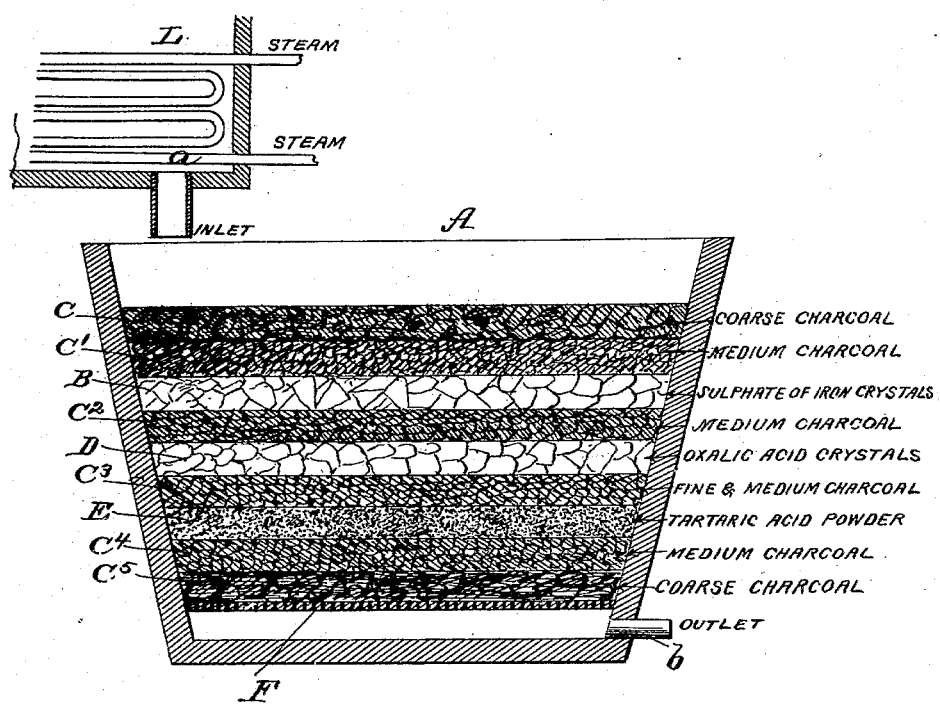
WITNESSES:
INVENTOR
Giles Otis Pearce
BY Munn & Co.
ATTORNEYS.

UNITED STATES PATENT OFFICE.

GILES OTIS PEARCE, OF COLORADO CITY, COLORADO.

PROCESS OF EXTRACTING GOLD FROM SOLUTIONS.

SPECIFICATION forming part of Letters Patent No. 556,690, dated March 17, 1896.

Application filed May 8, 1895. Serial No. 548,463. (No specimens.)

*To all whom it may concern:*

Be it known that I, GILES OTIS PEARCE, of Colorado City, in the county of El Paso and State of Colorado, have invented a new and useful Improvement in Processes of Extracting Gold and Platinum from Solutions, of which the following is a specification.

My invention is in the nature of an improved process for extracting and recovering gold and platinum from aqueous solutions of various compounds of these metals, and among such sources of gold and platinum to which my invention is chiefly applicable is sea-water, which by careful scientific analysis has been found to contain nearly one grain of gold for each ton of water. It is immaterial as to what form of chemical union the gold and platinum exists in as held in solution or how it becomes dissolved. It may be the chloride, iodide, bromide, fluoride, sulphate, nitrate, or chlorate, and the solution may be either neutral or acidulated.

My invention consists in collecting and precipitating the gold and platinum by reduction and precipitation through the agency of organic vegetable carbon matters, sulphate of iron, oxalic acid, and tartaric acid, which as combined regenerates or renews and continues the efficiency of the combination during the passage of aqueous solutions therethrough.

Heretofore gold and platinum compounds have been reduced to the metallic form by passing the solution of the same through carbon in the form of charcoal; but when this is used alone, after a short time the carbon loses its continuous powers and becomes coated over, and so it was and is not a continuous or perfect collector.

The objects of my invention are to thoroughly collect gold and platinum from their solutions and to make the operation of collecting the precious metals continuous and perfect without removing the carbon or charcoal from the containers or vats; and to this end my invention consists in mixing or using in connection with the charcoal or sawdust sulphate of iron and oxalic and tartaric acid, as and for the purpose hereinafter more fully described.

The figure is a vertical section of a filtering-tank or container for carrying out my invention.

A represents a tank with an open top and upwardly-flaring sides to which the solutions containing the precious metals are admitted from any source of supply through an inlet-pipe $a$ and from which the liquids are discharged through an outlet-pipe $b$, opening into the bottom of the tank beneath a false bottom F of perforated material. Above this false bottom are arranged alternating layers of charcoal and the reagents employed as follows: at the top first a layer C of coarse charcoal followed by a layer of medium charcoal $C'$ beneath it; then a layer B of sulphate-of-iron crystals followed by a layer $C^2$ of medium charcoal; then a layer D of oxalic-acid crystals and another layer $C^3$ of fine and medium charcoal. A layer E of tartaric-acid powder next follows and then a layer $C^4$ of medium and another, $C^5$, of coarse charcoal, which latter rests upon the false bottom of the tank.

The charcoal must be screened, using no smaller than one-sixteenth of an inch for fine and one-half an inch for the coarse, excepting the bottom layer of charcoal, which should be about two-inch pieces, three inches thick, and the false bottom may be a wire screen one-fourth-inch mesh.

Into the filtering-tank so constructed and charged the solutions containing gold and platinum are admitted and allowed to slowly percolate through, and while so passing the gold and platinum are thrown down or reduced by the sawdust or charcoal and sulphate of iron, oxalic acid and tartaric acid to metallic form and some in combinations according to the solution passed through, the efficiency of which combination for continuous action is maintained and preserved by the action of the sulphate of iron and oxalic and tartaric acid, which are renewed, as required, from time to time.

The solution flowing in at inlet is discharged first upon charcoal. Reaction by precipitation begins instantly. Some as metallic gold goes to the charcoal and is precipitated. The solution passing downward contacts with the sulphate-of-iron layer, and the iron precipitates and displaces further the gold—*i. e.*, it exchanges places with gold—and the gold thus thrown down is sulphide and is finally set free as an impure metal as the solution, passing downward through the charcoal or sawdust, contacts with the oxalic-acid layer. Very little, if any, gold passes beyond this zone, but as the solution passes downward it contacts with tartaric-acid layer and here platinum is precipitated, and as the solution passes outlet it is acetic to an extent.

If a larger proportion of platinum than gold is found to exist in the solution more tartaric acid will be required in proportion to the other reagents, as the tartaric acid is the agent which promotes the deposition of the platinum. If it is not practicable to secure charcoal I find that sawdust proves a good substitute.

In the reactions that occur in the tank an electrochemical action takes place, in which the precious metals in the aqueous solution represent the positive elements and the reagents in the tank the negative elements.

After the depositions of the elements of gold and platinum in the containers has been continued as long as desired, and always until the charge of sulphate of iron and oxalic and tartaric acids is exhausted and the maximum amount of gold and platinum stored in the charcoal, the latter is then taken out of the tank and the carbon burned off and the gold and platinum are left behind in an impure metallic state and may be then treated and refined in the usual way.

To facilitate the chemical action involved in the deposition of the elements of gold and platinum in the filter or tank a gentle heat may be applied to the container during the process by steam-pipe coils L submerged into the solution just before it enters the container.

In making use of my invention upon aqueous solutions flowing out of mines it may be desirable to first precipitate the baser metals by the use of carbonate of soda; but this is not necessary when my process is applied to sea-water or when connected with gas-tank of chlorination works.

Having thus described my invention, what I claim as new, and desire to secure by Letters Patent, is—

1. The process herein described of recovering gold and platinum from their aqueous solutions of these metals, which consists in passing the said aqueous solutions through a mass of vegetable carbon, sulphate of iron, oxalic acid and tartaric acid; arranged as shown to generate chemical electric reagents and reactions, of these elements, and to reduce and precipitate in the vat or vats, the precious metals of gold and platinum, and so continuously preserving the efficiency of the combination, substantially as and for the purposes described.

2. The process herein described of recovering gold and platinum metals from aqueous solutions of these metals, which consists in passing said solutions through a mass of vegetable carbon having associated with it sulphate of iron, oxalic acid and tartaric acid substantially as and for the purpose described.

3. The process herein described of recovering gold and platinum from aqueous solutions of these metals which consists in passing said aqueous solutions, as positive elements, through a mass of vegetable carbon having associated with it, sulphate of iron, oxalic acid and tartaric acid combined as shown (in the drawing) and all as negative elements, to secure the reductions and depositions of these metals in and upon the carbon, and afterward burning out the carbon, reducing and melting these metals into a mass substantially as and for the purpose described.

GILES OTIS PEARCE.

Witnesses:
CHAS. L. CUNNINGHAM,
R. J. ANSLOW.